June 21, 1960 C. M. WESCOTT 2,941,540
BRAKE VALVES
Filed June 17, 1958 2 Sheets-Sheet 1

Inventor:
Clair M. Wescott
By Munson Hare
Atty.

June 21, 1960
C. M. WESCOTT
2,941,540
BRAKE VALVES
Filed June 17, 1958
2 Sheets-Sheet 2
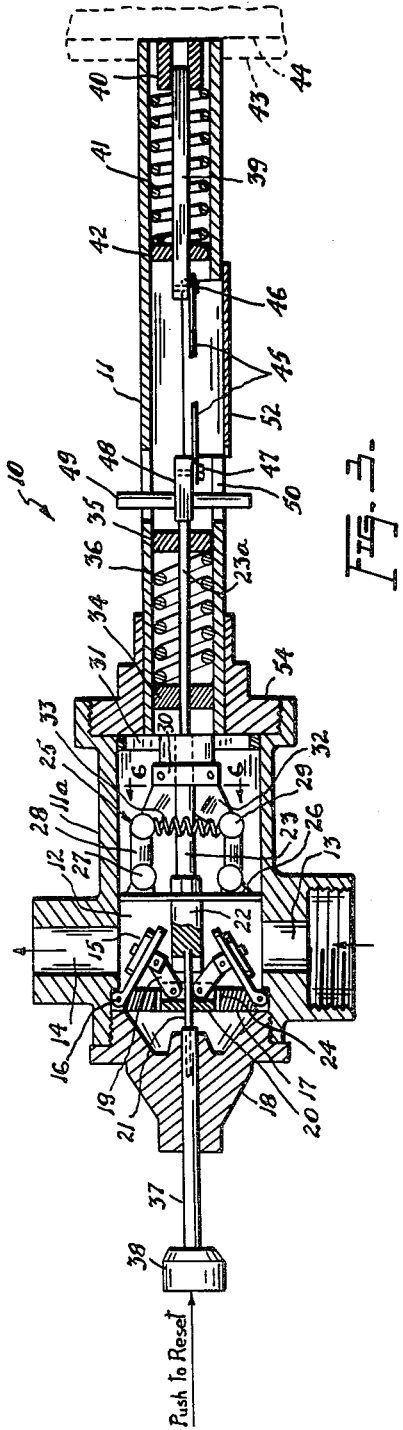
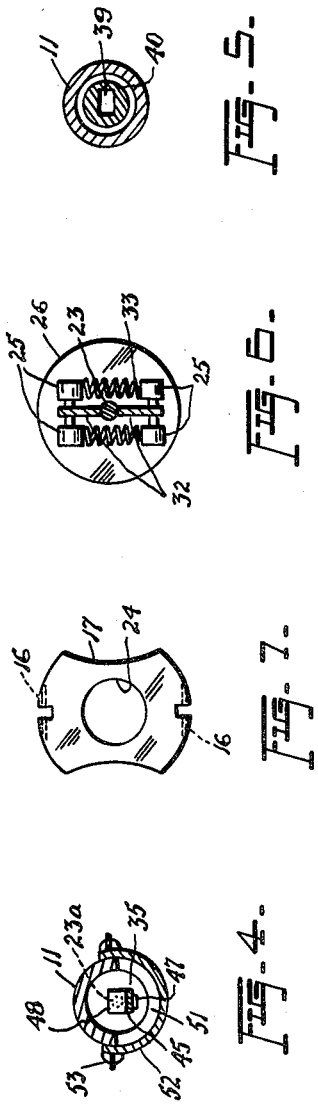
Inventor:
Clair M. Wescott
By Munson Khare
Atty.

United States Patent Office 2,941,540
Patented June 21, 1960

2,941,540

BRAKE VALVES

Clair M. Wescott, 2 Prindle Ave., Hornell, N.Y.

Filed June 17, 1958, Ser. No. 742,603

3 Claims. (Cl. 137—72)

This invention relates to new and useful improvements in brake valves, particularly valves for actuating air brake systems on railroad trains, and the principal object of the invention is to cause automatic application of brakes in the presence of an overheated journal or hot box, as it is often called, so as to safeguard in a positive manner against the serious damage which frequently results from such a condition.

As such, the invention resides in the provision of an air brake actuating valve which is automatically responsive to an overheated journal so that the train is brought to a stop as soon as an overheated journal develops.

An important feature of the invention, therefore, resides in the arrangement of the valve which permits the same to be readily installed in a conventional air brake system, while another feature resides in the structure of the valve itself, the same being fully automatic and dependable in operation and capable of expeditious re-setting after the overheated journal condition has been corrected.

With the foregoing more important objects and features and such other objects and features as may become apparent as this specification proceeds, the invention will be understood from the following description taken in conjunction with the accompanying drawings, wherein like characters of reference are used to designate like parts, and wherein:

Figure 3 is a sectional view, similar to that shown in Figure 1, but illustrating the invention in its tripped position;

Figure 4 is a cross-sectional detail, taken substantially in the plane of the line 4—4 in Figure 2;

Figure 5 is a sectional detail, taken substantially in the plane of the line 5—5 in Figure 1;

Figure 6 is a sectional detail, taken substantially in the plane of the line 6—6 in Figure 3; and Figure 7 is an elevational view of the valve supporting plate used in the invention.

Figure 1:
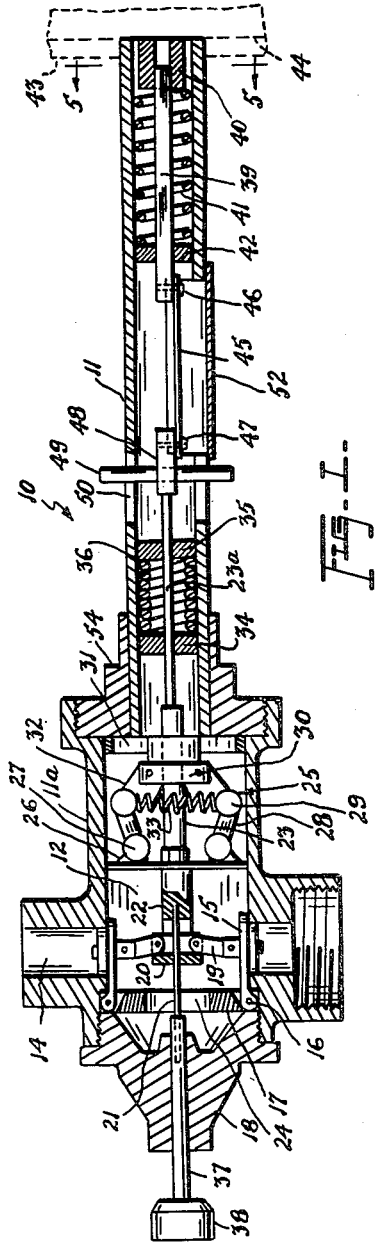
Figure 1 is a longitudinal sectional view of the invention in its initially set position.
Figure 2:
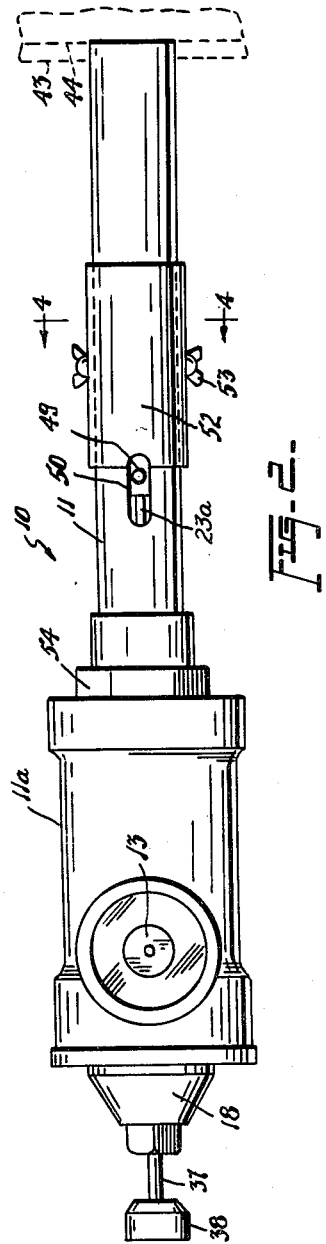
Figure 2 is an underside plan view thereof.

Referring now to the accompanying drawings in detail, the invention comprises a hot journal responsive brake valve which is designated generally by the reference numeral 10 and embodies in its construction an elongated housing 11 which is provided with an enlarged end portion 11a affording a valve chamber 12 therein. The chamber 12 is equipped with valve ports 13, 14, the port 13 being adapted to be in communication with the main brake line (not shown) of a conventional air brake system, wherein air pressure is maintained to maintain the brakes in an inoperative position, but wherein a drop in air pressure, such as by an exhaust of air into the atmosphere, causes the brakes to be applied. The valve port 14 exhausts into the atmosphere.

The valve ports 13, 14 are normally closed by a pair of coacting valve members 15 which are pivoted at 16 to a supporting plate 17, the latter being configurated substantially as shown in Figure 7 and retained in a fixed position in the chamber 12 by an end cap 18 of the housing portion 11a. The valve members 15 are connected by pivot links 19 to a toggle block 20 on a stem 21 which, in turn, is connected to a coupling 22 on an actuating rod 23 which is slidable axially in the housing portion 11a. The plate 17 is formed with a central opening 24 in which the block 20 is receivable when the valve is in its open position, as shown in Figure 3.

The rod 23 carries a mechanical movement biasing means designated generally by the numeral 25, which includes a disc 26 slidable in the housing portion 11a and having pivoted thereto as at 27 two pairs of links 28 which, in turn, are pivoted at 29 to a support collar 30 which is held in a fixed position in the housing portion 11a by a suitable spider 31. The collar 30 is equipped with a pair of pivoted arms 32 to which the pivots 29 of the links 28 are attached, and a pair of springs 33 are interposed between the pivots 29 in the respective pairs, whereby to normally urge the means 25 to its active position shown in Figure 3.

The actuating rod 23 is provided with an extension 23a which passes into the intermediate portion of the housing 11 and has secured thereto a disc 34, the rod extension 23a being slidable through a similar disc 35 which is secured in the housing. A compression spring 36 is interposed between the discs 34, 35, so that under the action thereof, the rod 23a, 23 may be slid into the chamber 12 to actuate the means 25 which, in turn, transmits its movement to the toggle block 20 and the latter moves the valve members 15 from their closed position shown in Figure 1 to their open position shown in Figure 3. With the opening of the valve, air from the brake line is, of course, exhausted through the port 14 into the atmosphere and the brakes of the train are automatically applied. The valve members 15 may be re-set to their closed position by a suitable re-setting stem 37 which is connected to the coupling 22 through the medium of the aforementioned stem 21 and, after passing through the cap 18 to the outside of the housing 11a, carries a knob 38.

The other end portion of the housing 11 contains a feeler element 39 which is in the form of a bar having a feeler head 40 secured to the outer end thereof, the head 40 being slidable in the housing and urged outwardly by a compression spring 41 which is interposed between the head and an abutment collar 42 which the housing contains, as shown. This end of the housing is adapted to be suitably secured in a journal box 43 so that the spring 41 urges the head 40 in constant engagement with the journal 44 and the temperature of the journal is thus conducted through the feeler element 39 to a fusible link 45 which is secured to the element 39 by a screw 46.

The other end of the link 45 is secured by a screw 47 to a connecting member 48 provided on the adjacent end of the rod extension 23a. The member 48 also carries a transverse pin 49 which projects outwardly from the housing 11 through a pair of diametrically opposite lateral slots 50.

It will be apparent from the foregoing that when the link 45 is intact, it will prevent sliding of the rod 23 under the action of the spring 36 and the valve will be retained in its closed position as shown in Figure 1. However, when the journal 44 becomes overheated, the temperature thereof will be conducted by the feeler element 39 to the fusible link 45 and, upon rupturing of the link, the spring 36 will be free to slide the rod 23 to actuate the means 25 and thereby cause opening of the valve members 15 and resultant application of the brakes.

The portion of the housing 11 adjacent the fusible link 45 is provided with an access opening 51 which is normally closed by a curved cover plate 52, held in place by suitable wing bolts 53. Upon removal of the plate 52, the ruptured link 45 may be replaced by simply grasping the pin 49 to slide the rod 23 against the action of the spring 36 to its initial position, whereby the member 48 is brought close enough to the feeler element 39 to facilitate the installation of a new fusible link. The sliding of the rod 23 in the housing is permitted by a movement of the pin 49 in the aforementioned slots 50.

It may also be noted that apart from the end cap 18, the housing portion 11a is also provided with a second end cap 54 to permit access to the valve chamber 12 and the various parts contained therein.

While in the foregoing there has been described the preferred embodiment of the invention, various modifications may become apparent to those skilled in the art to which the invention relates. Accordingly, it is not desired to limit the invention to this disclosure and various modifications may be resorted to, such as may lie within the spirit and scope of the appended claims.

What is claimed as new is:

1. In a hot journal responsive brake valve, the combination of a valve housing provided with a valve chamber having port means adapted to communicate with an air brake system and with the atmosphere, normally closed valve means provided in said chamber for said port means, mechanical movement biasing means provided in the chamber for opening said valve means, a tubular extension carried by said housing and having an open outer end and an inner end in communication with said chamber, an elongated actuating element slidable in the inner end portion of said extension toward and away from said biasing means, said actuating element having inner and outer ends and the inner end thereof being operatively connected to the biasing means for causing said biasing means to open said valve means when the actuating element is slid in said extension toward the biasing means, resilient means provided in the inner end portion of the extension and urging said actuating element toward said biasing means, a feeler element provided in the outer end portion of said extension and adapted to engage a journal, and a fusible link provided in said extension, said link extending between and being connected to said feeler element and the outer end of said actuating element, whereby to be normally subjected to a tensional force by said resilient means while sustaining said biasing means against opening said valve means and whereby said resilient means may cause said actuating element to slide toward and actuate the biasing means to open the valve means when said fusible link is ruptured.

2. The device as defined in claim 1 wherein said feeler element is slidable inwardly and outwardly in the outer end portion of said extension, and resilient means provided in said extension for urging said feeler element outwardly in engagement with a journal.

3. The device as defined in claim 1 together with means accessible from the outside of said housing and operatively connected to said valve means for re-setting the same to its closed position.

References Cited in the file of this patent

UNITED STATES PATENTS

| | | |
|---|---|---|
| 761,701 | Palmer | June 7, 1904 |
| 1,058,993 | Marvin | Apr. 15, 1913 |